July 25, 1967  S. COOPER  3,332,726

BEARING ASSEMBLY

Filed March 24, 1965

Inventor
Stanley Cooper

By
Cushman, Darby & Cushman
Attorneys

United States Patent Office 3,332,726
Patented July 25, 1967

3,332,726
BEARING ASSEMBLY
Stanley Cooper, Littleover, Derby, England, assignor to Rolls-Royce Limited, Derby, England, a British company
Filed Mar. 24, 1965, Ser. No. 442,265
Claims priority, application Great Britain, Apr. 14, 1964, 15,471/64
7 Claims. (Cl. 308—9)

ABSTRACT OF THE DISCLOSURE

A location bearing assembly for a gas turbine engine or the like capable of transmitting axial loads and or bending moments from the inner race through the rolling elements to the outer race and surrounding structure. The bearing assembly utilizes a radially extending hydrodynamic film to take the axial loads and vibrations and an axially and circumferentially extending hydrodynamic film to take the radial loads and vibrations, the films being in communication with one another by means which prevent interaction between the pressures developed in the respective films.

---

Figures 1, 2:
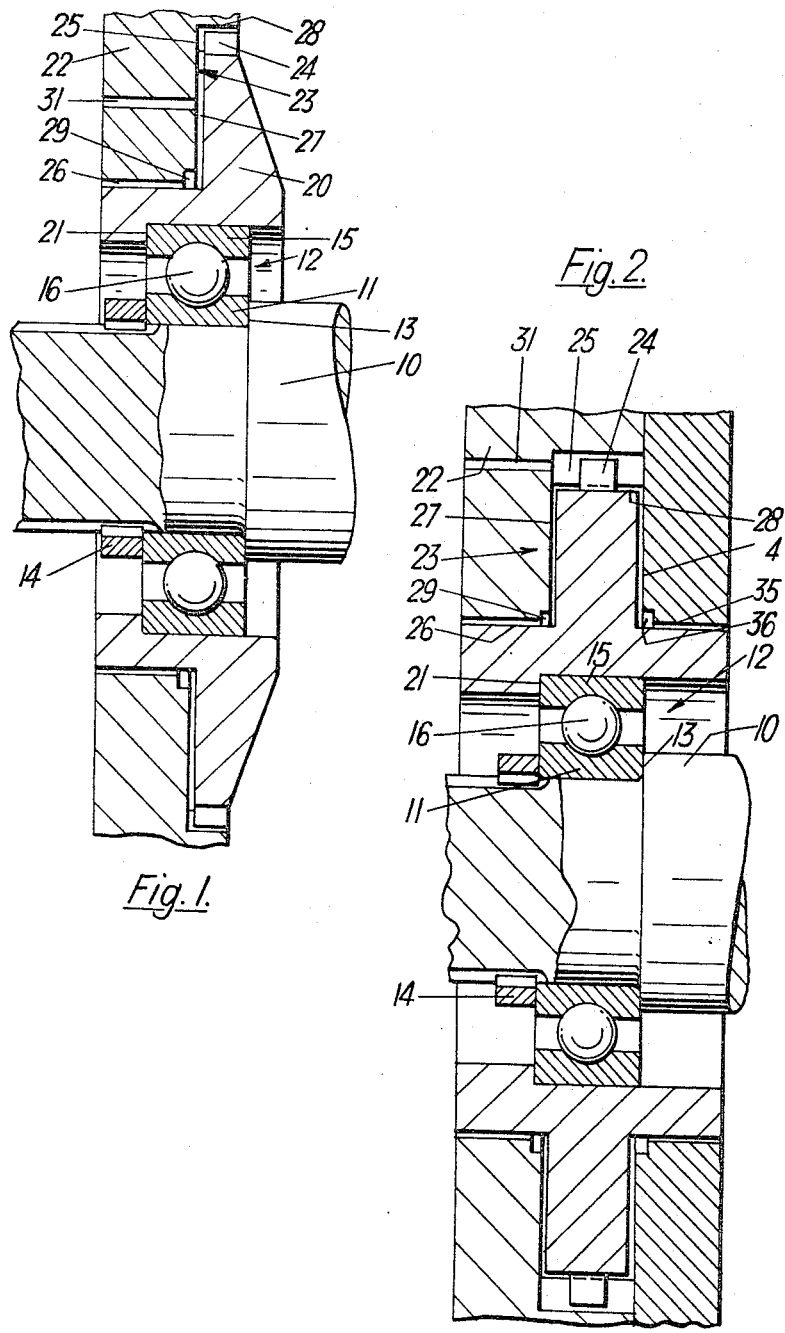

This invention concerns a bearing assembly.

According to the present invention, there is provided a bearing assembly comprising concentric inner and outer races, rolling elements therebetween, a shaft mounted within the inner race, fixed structure, a free splined connection between the fixed structure and the outer race, said fixed structure and outer race defining therebetween a gap adapted to contain a hydrodynamic film of oil, and means for supplying said gap with oil, such that a hydrodynamic squeeze film is, in operation, built up therein.

The term "free splined connection" is intentded to mean a connection which permits relative axial and/or radial movements but no relative rotary movements between the splined members. The term "hydrodynamic squeeze film of oil" is intended to mean a film of oil which, when squeezed by relative vibratory movement between two members opposes the relative movement by a build up of pressure within the film. The pressure build up is due entirely to vibratory movement and constant forces urging two components together is not sufficient unless accompanied by the vibratory movement.

Although reference is made herein to "the outer race," this term, where used in the claims, is intended to include reference to any structure (e.g. 20) which is fixed thereto and thus effectively forms part thereof.

The pressure which, in operation, is developed in the oil in the said gap is preferably due to relative movement e.g. swash (i.e. axial vibratory movements) or eccentric rotation between the fixed structure and the outer race or structure secured thereto.

The gap may have a radially extending portion. Preferably the gap has two radially extending portions which are disposed on opposite sides axially of the outer race, whereby the hydrodynamic squeeze film built up by swash in the two radially extending portions carries the axial thrust loads in either axial direction.

The gap may also have an axially extending portion such that the hydrodynamic squeeze film which in operation, is built up therein due to eccentric rotation carries the radial load.

The invention also comprises a gas turbine engine having a bearing assembly as set forth above.

The invention is illustrated, merely by way of example, in the accompanying drawings, in which:

FIGURES 1 and 2 are broken-away sectional views of two different embodiments of a bearing assembly according to the present invention.

Referring first to FIGURE 1, a shaft 10 is mounted in an inner race 11 of a thrust bearing 12. The shaft 10 has a shoulder 13 against which the inner race 11 is located by means of a clamp ring 14 which is secured to the shaft 10. The bearing 12 has an outer race 15 and an assembly of balls 16 which are in rolling contact with the inner and outer races 11, 15.

The outer race 15 is mounted within a hub 20 which has a shoulder 21 against which the outer race 15 is located.

The hub 20 is mounted within fixed structure 22 from which it is spaced by a gap 23. The hub 20, and hence the outer race 15, are prevented from rotation by virtue of being provided with splines 24 which mesh freely with splines 25 in the fixed structure 22. The freely meshing splines 24, 25 permit relative axial and radial freedom.

The gap 23 has an axially extending portion 26, a radially extending portion 27, and an axially extending portion 28. An annular groove 29 is provided at the annular edge defined between and common to portions 26 and 27.

The gap 23 is such that a hydrodynamic squeeze film of oil may be maintained therein. The oil is adapted to be supplied to the gap 23 by way of an oil passage 31, the oil leaving the gap 23 through the axially extending portions 26, 28.

In operation, a pressure will be built up in the oil in the gap 23, the pressure in the axially extending portions 26 and 28 being due almost entirely to eccentric rotary movement of the shaft 10 together with that of the bearing 12 and hub 20 carried thereby relative to fixed structure 22 and the pressure in the radially extending portion 27 being due to swash between hub 20 and structure 22, such movement being due, for example, to slight inaccuracies in manufacture. This pressure in the hydrodynamic squeeze film of oil in the gap 23 enables the axial load in a leftward direction as seen in FIGURE 1, to be taken by the oil in the radially extending portion 27 and the radially outward load to be taken by the axially extending portion 26.

A steady pressure is developed in annular groove 29, thus preventing interaction between the pressures of the films in portions 26 and 27.

In FIGURE 2 there is shown a construction which is generally similar to that of FIGURE 1, and which for this reason will not be described in detail, like parts being given the same numerals.

In the FIGURE 2 construction, however, the gap 23, in addition to being provided with axially extending portions 26, 28 and a radially extending portion 27, is also provided successively with a radially extending portion 34 and an axially extending portion 35. An annular groove 36 is also provided at the junction of portions 34, 35, serving the same function as annular groove 29. Oil supplied to the passage 31 will therefore flow out through the axially extending portions 26, 35.

Thus, in the FIGURE 2 construction, not only are the radial loads taken by the axially extending portions 26, 35, but the axial loads in the two opposite axial directions are taken by the radially extending portions 27, 34 respectively.

The shaft 10 of either the FIGURE 1 or the FIGURE 2 construction may be constituted by the main shaft of a gas turbine engine (not shown).

It will be appreciated that in both the FIGURE 1 and the FIGURE 2 construction, the use of the hydrodynamic film of oil enables the shaft 10 to be given both some axial and some radial freedom thus enabling one to modify the frequency response of the system (and thus the transmitted dynamic load between the members) by suitable design of the components. Since the gap 23 is disposed between members which are not rotating, the bearing assembly will fall safely in the case of excessive load or in the case of a failure of the oil supply and, on the other hand, will be self restoring once the excessive load has been removed or the oil supply resumed.

The use of the hydrodynamic film in the gap 23 will serve to attenuate the forces transmitted to the fixed structure 22 by reason of any eccentricity in the shaft 10 and due to eccentric rotation or swash between the bearing and fixed structure.

There is a phase difference between the angular displacement of the shaft 10 with respect to the fixed structure 22 and the couple which, in operation, is transmitted to the fixed structure 22 by the shaft 10 in consequence of the said angular displacement. This phase difference may be of assistance in modifying the vibration frequency response of the fixed structure 22 to other dynamic loads transmitted thereto by the bearing 12.

Thus, for example, if the bearing 12 is designed to be lightly loaded, the couple is in phase with the velocity of the swash or eccentric rotary movement. If, on the other hand, the bearing 12 is designed to be heavily loaded, the said couple is more nearly in phase with the displacement of the swash or eccentric movement.

I claim:

1. A location bearing assembly comprising: concentric inner and outer races, and rolling elements therebetween, said rolling elements coacting with said inner and outer races so as to be capable of transmitting axial loads, radial loads and bending moments therebetween; a shaft mounted within said inner race; fixed structure; means permitting relative axial and radial movement but preventing relative rotation between said fixed structure and said outer race, said fixed structure and said outer race defining therebetween a gap having intercommunicating radially and axially extending portions each of which is adapted to contain a hydrodynamic film of oil to carry a thrust load; means for supplying said gap with oil to build up, in operation, the said films in said radially and axially extending portions.

2. A location bearing as claimed in claim 1 including means for preventing interaction between pressures of the films in the radially and axially extending portions.

3. A location bearing as claimed in claim 2 in which said last-mentioned means for preventing interaction between the pressures comprises at least one annular groove providing intercommunication between adjacent ends of said radially and axially extending portions of said gap.

4. A location bearing assembly as claimed in claim 1 in which said gap has two radially extending portions and two axially extending portions, said two radially extending portions being disposed on opposite axial sides of said outer race, said radially extending portions communicating respectively with said two axially extending portions.

5. A location bearing assembly as claimed in claim 1 in which said oil supplying means includes a common passage for supplying all of said portions with oil.

6. A location bearing assembly as claimed in claim 1 in which said means to permit relative axial and radial movement is a splined connection between said outer race and said fixed structure.

7. A location bearing as claimed in claim 5 including a hub within which said outer race is fixed, and in which said splined connection is between said hub and said fixed structure.

References Cited

UNITED STATES PATENTS

| | | | |
|---|---|---|---|
| 656,310 | 8/1900 | Warburton | 308—9 |
| 2,576,141 | 11/1951 | Pike | 308—26 |
| 2,631,901 | 3/1953 | Holben et al. | 308—184 |

MARTIN P. SCHWADRON, *Primary Examiner.*

FRANK SUSKO, *Examiner.*